US007474989B1

(12) United States Patent
Wilcoxon (10) Patent No.: US 7,474,989 B1
(45) Date of Patent: Jan. 6, 2009

(54) METHOD AND APPARATUS FOR FAILURE PREDICTION OF AN ELECTRONIC ASSEMBLY USING LIFE CONSUMPTION AND ENVIRONMENTAL MONITORING

(75) Inventor: Ross K. Wilcoxon, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 146 days.

(21) Appl. No.: 11/084,678

(22) Filed: Mar. 17, 2005

(51) Int. Cl.
*G06F 11/30* (2006.01)
(52) U.S. Cl. .................. 702/185; 700/21; 702/182; 702/183
(58) Field of Classification Search ............. 702/185, 702/183, 182, 179, 84; 700/21; 73/777
See application file for complete search history.

(56) References Cited

U.S. PATENT DOCUMENTS

2002/0161457 A1\* 10/2002 Hershey et al. ............... 700/21

OTHER PUBLICATIONS

Applicant Admitted Prior Art—U.S. Appl. No. 11/081,804, filed Mar. 16, 2005.

\* cited by examiner

*Primary Examiner*—John H Le
(74) *Attorney, Agent, or Firm*—Nathan O. Jensen; Kyle Epple (57) ABSTRACT

Presently disclosed are a method and apparatus for predicting a failure in an electronic assembly by detecting an incremental change exhibited by a sacrificial sensor that is integrated into the electronic assembly and by monitoring environmental conditions that the electronic assembly is exposed to. A failure prediction is that made according to the detected incremental change exhibited by the sacrificial sensor and according to the monitored environmental conditions.

2 Claims, 10 Drawing Sheets

METHOD AND APPARATUS FOR FAILURE PREDICTION OF AN ELECTRONIC ASSEMBLY USING LIFE CONSUMPTION AND ENVIRONMENTAL MONITORING

RELATED APPLICATIONS

The present application relates to copending application number Ser. No. 11/081,804 titled "METHOD AND APPARATUS FOR LIFE CONSUMPTION BASED FAILURE PREDICTION OF AN ELECTRONIC ASSEMBLY" by Palmer et al., filed on Mar. 17, 2005. This copending application is integrated herein by reference in its entirety.

BACKGROUND

The term "prognostics" refers to a particular field of science wherein failure of an apparatus can be predicted by monitoring various operational parameters, including, but not limited to environmental conditions, related to the operation of that apparatus. We are all familiar with prognostics to one degree or another. For example, prognostics are commonly used in automobiles. By monitoring the pressure at which oil is circulated throughout the engine, an indicator can be developed which will identify when the oil pump in the car is on the verge of failing. As a user, we can appreciate that when the oil pressure falls below what we consider a normal level, there must be something wrong with the oil pump. A prudent user will then have the oil pump serviced by a technician. Of course, this is a very simplistic example of how prognostics are used to predict a failure.

A somewhat more sophisticated example of prognostics can be found on an airplane. Various sensors continuously record temperature and vibration, along with other factors, that a jet engine experiences during operation. It is not practical to require a pilot to make a maintenance decision, for example for a jet engine, based on a wide assortment of temperature, vibration and other factors. In an actual aircraft system, this information is monitored by a computer system. The computer system consults a failure prediction model in order to predict when the jet engine either requires maintenance or is on the verge of failure. There are two predominant forms of failure prediction models used to support prognostic analysis. One type of failure prediction model is a purely theoretical failure prediction model. A purely theoretical failure prediction model is developed by analyzing the various components included in an assembly and applying specialized knowledge with respect to how these components might fail when subjected to various environmental stress factors. Another form of failure prediction model is known as an empirical failure prediction model. An empirical failure prediction model is developed by subjecting a qualification version of an assembly to various environmental stress factors. As the qualification version of the assembly is subjected to these various environmental stress factors, stress factors are recorded and various actual failures that may occur are recorded and correlated with the amount of environmental stress factor to which the assembly has been subjected.

Yesterday, in a co-owned application, Palmer et al. described a method and apparatus for predicting failure through the use of a sacrificial sensor. Using the sacrificial sensor, the sensitivity of failure of an assembly is correlated with failures exhibited by a sacrificial sensor as an entire assembly is exposed to various environmental stress factors. The use of a sacrificial sensor is clearly a vast improvement when considering the field of prognostics as a whole. However, even the use of the sacrificial sensor has its drawbacks.

A sacrificial sensor is typically sensitive to varying degrees of exposure to an environmental stress factor. In order to improve a failure prediction based on changes exhibited by a sacrificial sensor, the sacrificial sensor must be capable detecting numerous discrete levels of exposure to a particular environmental stress factor. Again, this is an important advance in the field of prognostics. However, in order to achieve even higher levels of predictive fidelity, a sacrificial sensor may need to be sensitive to hundreds, if not thousands of distinct fragility levels.

SUMMARY

Presently disclosed are a method and apparatus for predicting a failure in an electronic assembly by detecting an incremental change exhibited by a sacrificial sensor that is integrated into the electronic assembly and by monitoring environmental conditions that the electronic assembly is exposed to. A failure prediction is that made according to the detected incremental change exhibited by the sacrificial sensor and according to the monitored environmental conditions.

BRIEF DESCRIPTION OF THE DRAWINGS

The present invention will hereinafter be described in conjunction with the appended drawings and figures, wherein like numerals denote like elements, and in which.

DETAILED DESCRIPTION OF THE INVENTION

Figure 1:
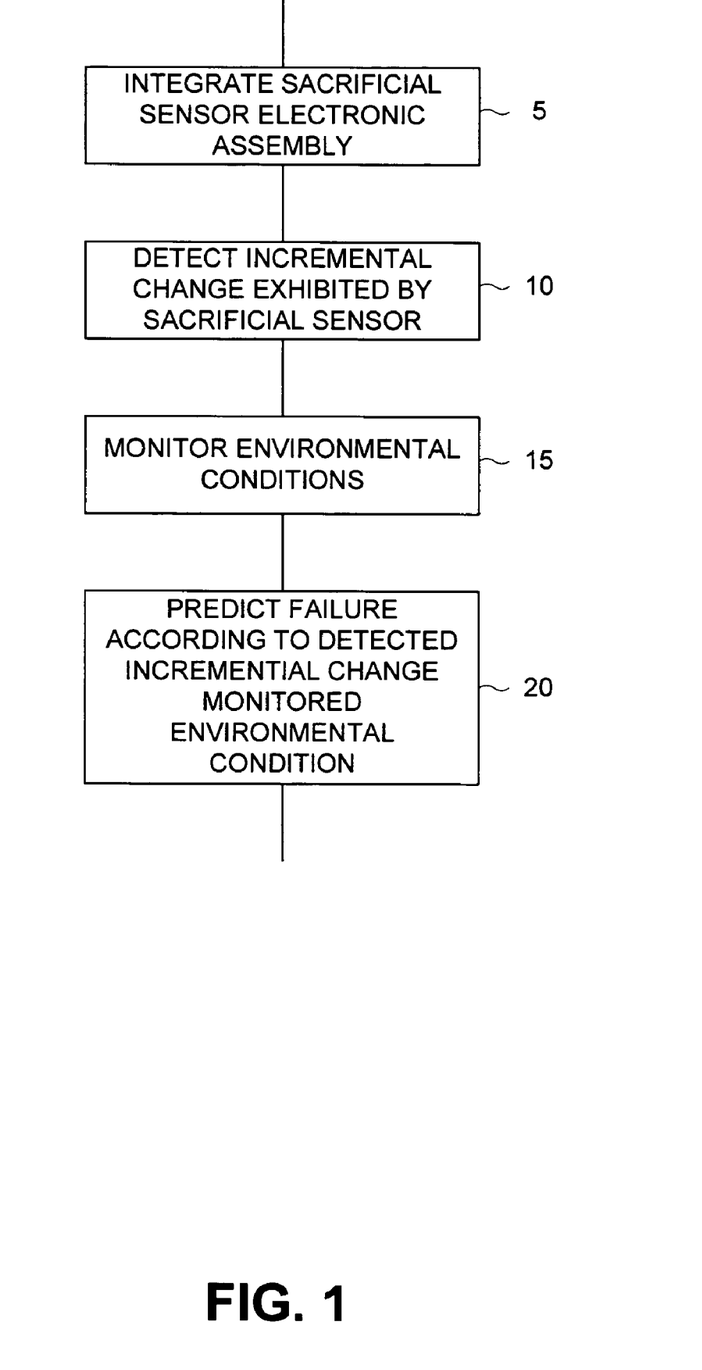
FIG. 1 is flow diagram that depicts one example method for predicting a failure of an electronic assembly.

FIG. 1 is flow diagram that depicts one example method for predicting a failure of an electronic assembly. According to this example method, a failure in an electronic assembly is predicted by integrating a sacrificial sensor into the electronic assembly (step 5). Any incremental change exhibited by the sacrificial sensor is then detected (step 10). Environmental conditions to which the electronic assembly is subjected are then monitored (step 15). A failure is then predicted according to the detected incremental change and the monitored environmental condition (step 20).

It should be appreciated that, as described in the referenced copending patent application, a sacrificial sensor is used to determine a cumulative level of damage that may be imparted upon the electronic assembly. By detecting an incremental change exhibited by the sacrificial sensor, a cumulative level of damage that may be imparted upon the electronic assembly is used to refine a failure prediction model. Once the failure prediction is refined according to an incremental change exhibited by the sacrificial sensor, the refined failure model is used to predict a potential failure in the electronic assembly. It should be appreciated that the refined failure model is then consultant according to the monitored environmental condition.

Figure 2:
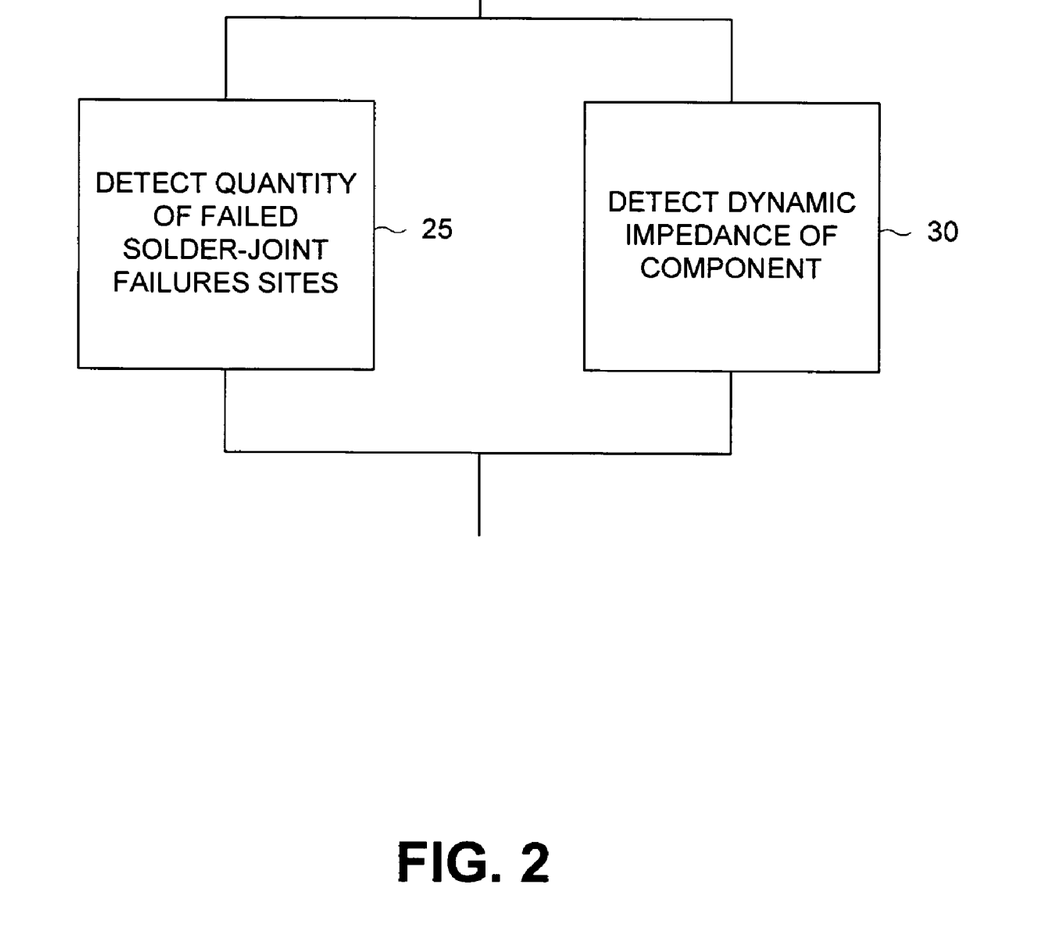
FIG. 2 is a flow diagram that depicts alternative example methods for detecting an incremental change exhibited by a sacrificial sensor.

FIG. 2 is a flow diagram that depicts alternative example methods for detecting an incremental change exhibited by a sacrificial sensor. According to one alternative example variation of the present method, incremental change exhibited by a sacrificial sensor is detected by detecting a quantity of failed solder-joint failure sites (step 25). The applicant encourages the reader to consultant the referenced copending patent application for a further discussion of how a solder-joint failure sites is correlated to at least one of thermally induced fatigue and mechanically induced fatigue. It should be appreciated that detecting a failed solder-joint failure sites is merely one example method by which thermal fatigue and/or mechanical fatigue can be detected. Accordingly, these example variations of the present method are not intended to limit the scope of the claims appended hereto. According to yet another variation of the present method, incremental change exhibited by a sacrificial sensor is detected by detecting a dynamic impedance of a component (step 30). The reader is again asked to consultant the copending patent application for a further discussion on how dynamic impedance of a component is correlated to the presence of humidity or a corrosive substance. It should likewise be appreciated that detecting a dynamic impedance of a component is merely one example method by which degradation of a component caused by exposure to humidity or a corrosive substance can be detected. Accordingly, this example method for detecting an incremental change exhibited by a sacrificial sensor is not intended to limit the scope of the claims appended hereto.

Figure 3:
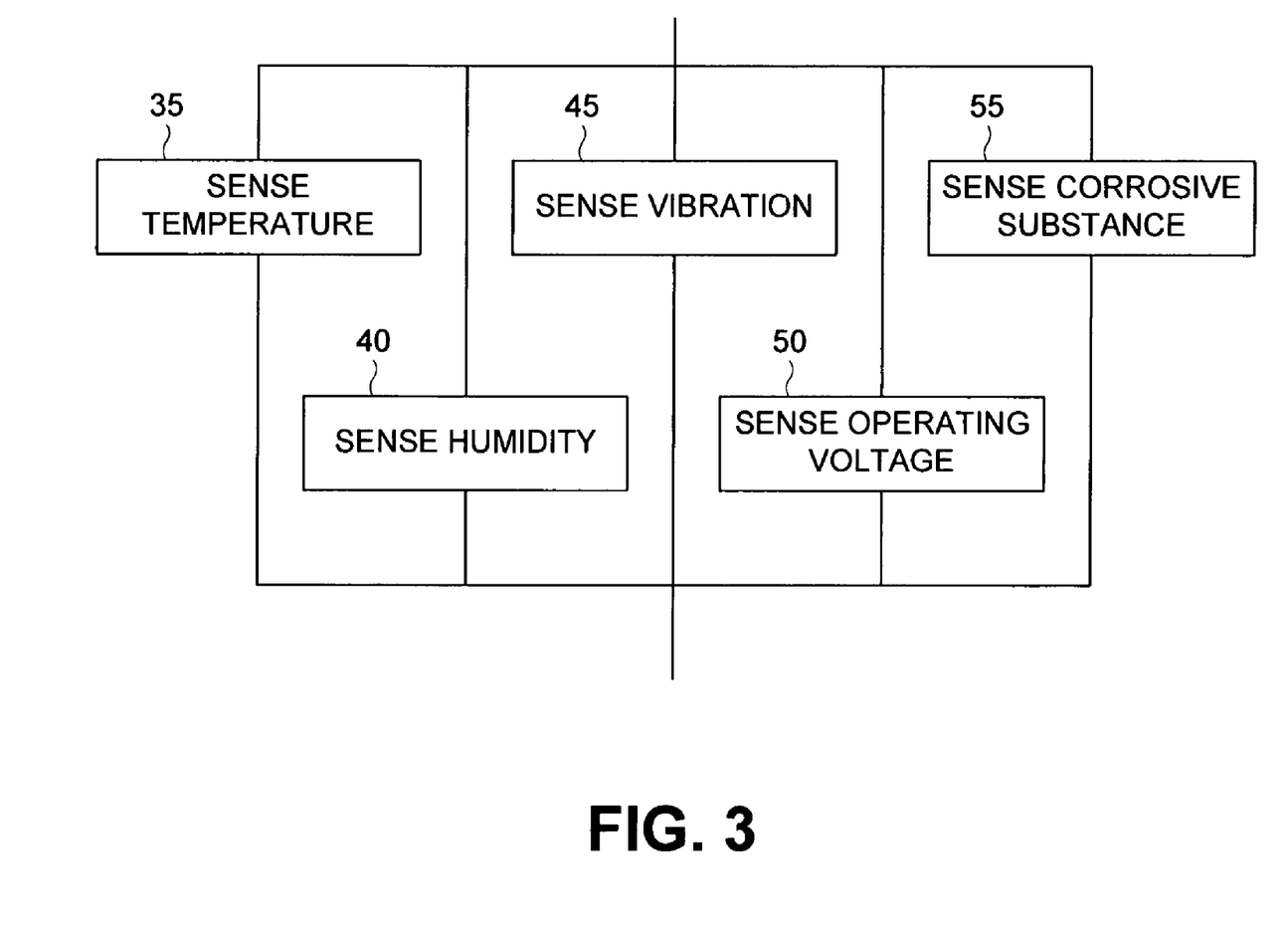
FIG. 3 is a flow diagram that depicts alternative example methods for monitoring an environmental condition.

FIG. 3 is a flow diagram that depicts alternative example methods for monitoring an environmental condition. Any of the example variations of the present method for monitoring an environmental condition presented herein are presented solely to illustrate various alternative example methods and are not intended to limit the scope of the claims appended hereto. According to one example variation of the present method, an environmental condition is monitored by sensing a temperature (step 35). It should be appreciated that sensing a temperature, according to one illustrative use case, is accomplished by sensing a voltage developed by a thermal sensor (e.g. a thermocouple). Typically, the thermal sensor is integrating into the electronic assembly such that an ambient temperature for the electronic assembly is sensed. According to yet another example variation of the present method, an environmental condition is monitored by sensing a humidity level (step 40). According to one illustrative use case, a thermoset capacitive polymer sensor is applied as a humidity detector. A thermoset capacitive polymer sensor comprises parallel plates, each of which includes a porous electrode disposed on a substrate. The electrode is typically coated with a dielectric polymer that absorbs, or desorbs, water vapor from the environment with changes in humidity. The resulting change in dielectric constant causes a variation in capacitance. The impedance of this type of device then varies in relation to an ambient humidity.

According to yet another illustrative variation of the present method, monitoring an environmental condition comprises sensing a vibration level (step 45). It should be appreciated that vibration, according to one illustrative use case, is sensed by means of an accelerometer. It should also likewise be appreciated that vibration, according to this example variation of the present method, also includes various levels of shock. Shock, according to this example variation of the present method, is also sensed by means of an accelerometer. According to one variation of the present method, shock or vibration are detected at the electronic assembly itself. According to yet another variation of the present method shock or vibration is detected proximate to the electronic assembly, for example by monitoring shock or vibration imparted onto a chassis wherein the electronic assembly is installed.

According to yet another example variation of the present method, monitoring an environmental condition comprises sensing the level of an operating voltage (step 50) which is applied to the electronic assembly. It should be appreciated that the level of voltage applied to an electronic assembly may cause stress to various electronic components included in the electronic assembly. Sensing a voltage level can be accomplished in numerous ways, for example by converting a voltage level into a digital number or by comparing the voltage level to discrete comparison thresholds.

According to one alternative variation of the present method, monitoring an environmental condition comprises sensing the presence of a corrosive substance (step 55). According to one illustrative use case, a corrosive substance is detected using a corrosion sensor. Typically, a corrosion sensor is based on the principle of galvanic corrosion. Accordingly, a typical corrosion sensor comprises two dissimilar metals that are electrically connected to each other and exposed to a corrosive environment. When so exposed to a corrosive environment, an electric current is generated through a dissimilar metal interface. The magnitude of the current is directly proportional to the corrosivity of a local environment. It should be appreciated that such a corrosion sensor is typically integrated directly into the electronic assembly. However, it should be appreciated that the corrosive sensor need not necessarily be integrated into the electronic assembly and may be disposed proximate thereto.

Figure 4:
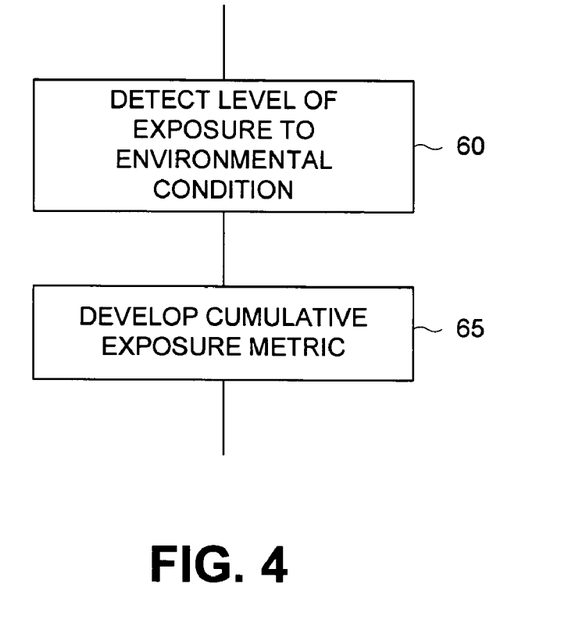
FIG. 4 is a flow diagram that depicts alternative methods for monitoring an environmental condition by developing a cumulative exposure metric.

FIG. 4 is a flow diagram that depicts alternative methods for monitoring an environmental condition by developing a cumulative exposure metric. According to this example variation of the present method, a level of exposure to an environmental condition is detected (step 60). Typically, a level of exposure is expressed in a system of units corresponding to a particular environmental condition. For example, temperature is expressed in degrees. Shock or vibration is typically expressed in terms of acceleration. These are merely examples of different types of units that are used to express a level of exposure of a particular environmental condition. Once a level of exposure is detected, a cumulative metric is then determined (step 65). Typically, this is accomplished by recording a particular level of exposure over a particular period of time. According to one variation of the present method, an integration of an exposure level is conducted over incremental time periods. As such, a cumulative exposure metric is typically expressed in terms of a particular unit of expression multiplied by time. For example, where a particular electronic assembly is exposed to a temperature of 50 degrees for one hour, a cumulative metric descriptive of this condition would be 50 degree-hours. Likewise, if the temperature of 50 degree is maintained for two hours, the cumulative metric for this condition would be 100 degree-hours.

All of the various units of expression presented herein are intended to illustrate the present method and are not intended to limit the scope of the claims appended hereto.

Figure 5:
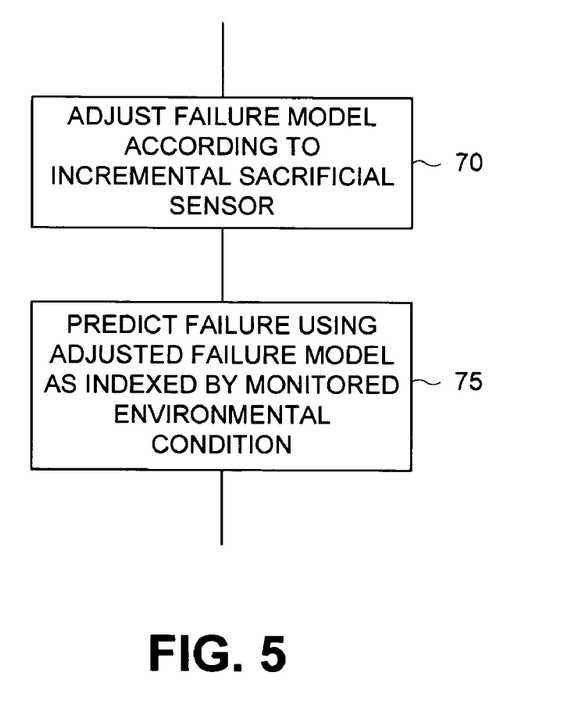
FIG. 5 is a flow diagram that depicts one example method for predicting a failure of an electronic assembly.

FIG. 5 is a flow diagram that depicts one example method for predicting a failure of an electronic assembly. According to this example variation of the present method, a failure model is adjusted according to an incremental change exhibited by the sacrificial sensor (step 70). It should be appreciated that a failure model is typically provided for the purposes of predicting a failure in electronic assembly. It should likewise be appreciated that a failure model, according to one variation of the present method, includes a theoretical failure model. According to yet another variation of the present method, a failure model comprises an empirical failure model. In yet another variation of the present method, a failure model includes both theoretical and empirical information. It should be appreciated that a wide variety of failure models can be employed to predict a failure of an electronic assembly and the examples presented herein are not intended to limit the scope of the claims appended hereto. It should likewise be appreciated that at least one out of a theoretical prediction and an empirical prediction included in the failure model are adjusted according to the present method. A failure is then predicted using the adjusted failure model (step 75). It should be appreciated that the adjusted failure model is consulted according to a monitored environmental condition. For example, a cumulative exposure metric, as described supra, is one of the several different means of retrieving information from the failure model in order to generate a failure prediction.

Figure 6:
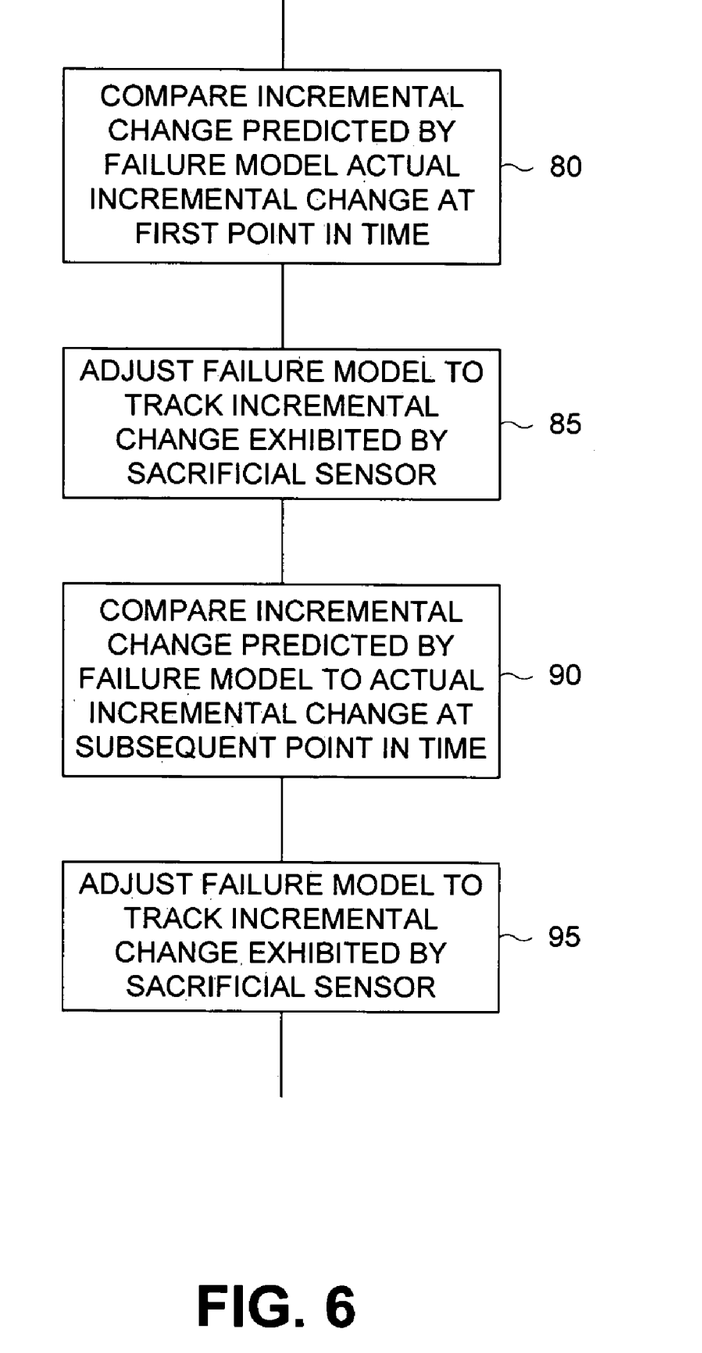
FIG. 6 is a flow diagram that depicts alternative example methods for adjusting a failure model.

FIG. 6 is a flow diagram that depicts alternative example methods for adjusting a failure model. According to one example variation of the present method, a failure model is adjusted by comparing a prediction of an amount of incremental change (as predicted by the failure model) that should be exhibited by the sacrificial sensor to an actual amount of incremental change exhibited by the sacrificial sensor at a first point in time (step 80). It should be appreciated that, according to one illustrative use case, the failure model includes predictions for an incremental change that should be exhibited by the sacrificial sensor as well as other failure and degradation predictions for other components included in the electronic assembly. It should likewise be appreciated that these predictions are typically based on a particular level of cumulative exposure to a particular environmental condition, also known as an environmental stress factor. Accordingly, the failure model is adjusted to track the incremental change exhibited by the sacrificial sensor (step 85). This is typically accomplished by adjusting the exposure level that corresponds to the incremental change exhibited by the sacrificial sensor such that other failure and degradation predictions for other components included in the electronic assembly are adjusted by such adjustment to the exposure level for the sacrificial sensor. Again, it should be appreciated that, according to one variation of the present method, an exposure level is typically used as an independent variable when accessing information in the failure prediction model.

According to yet another example variation of the present method, the failure model is again consulted to predict the incremental change that should be exhibited by the sacrificial sensor and comparing this to an actual incremental change exhibited by the sacrificial sensor at a subsequent point in time (step 90). The failure model is then adjusted to reflect the incremental change exhibited by the sacrificial sensor (step 95). In this manner, the failure model is continuously adjusted at different point in time as the sacrificial sensor continues to record the expenditure of service life expected from the electronic assembly.

Figure 7:
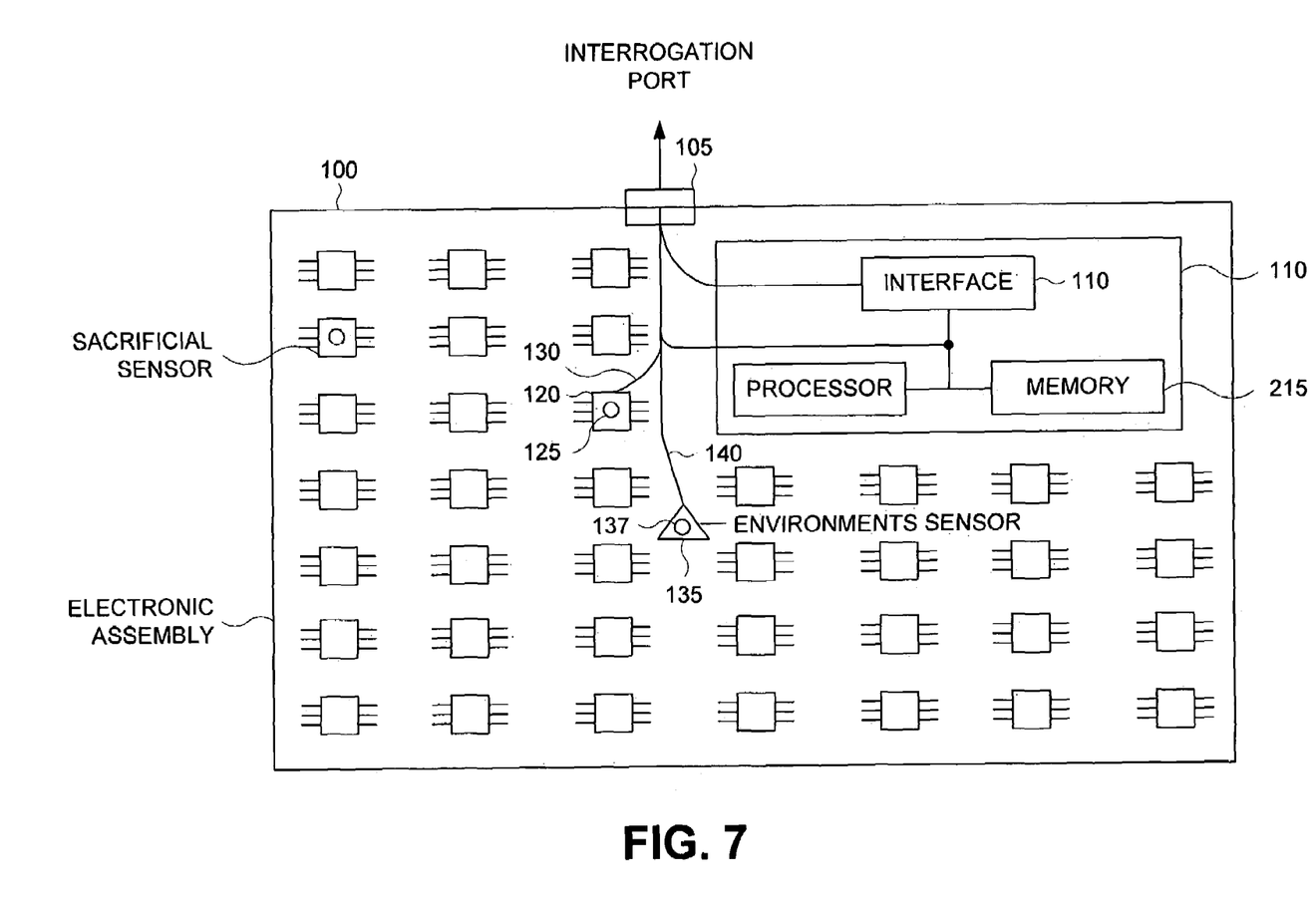
FIG. 7 is a block diagram that depicts one example embodiment of an electronic assembly.

FIG. 7 is a block diagram that depicts one example embodiment of an electronic assembly. According to this example embodiment, the electronic assembly comprises a functional circuit which is embodied on a substrate 100. It should be appreciated that the electronic circuit will typically included a number of functional components which are attached to the substrate 100 by means of solder connections. This example embodiment of an electronic assembly also includes a sacrificial sensor 120, which is typically integrated into the electronic assembly in a manner substantially similar to that used to integrate other functional components onto the substrate 100.

The electronic assembly of this example embodiment further comprises a detector 125, which is capable of detecting a incremental change exhibited by the sacrificial sensor. The detector 125 is further capable of generating a detection signal 130 according to an incremental change exhibited by the sacrificial sensor 120. Also included in this example embodiment of an electronic assembly are one or more environmental sensors 135. Associated with an environmental sensor is a conditioning circuit 137, which is also included in this alternative example embodiment of an electronic assembly. It should be appreciated that the conditioning circuit 137 generates an environmental stress signal 140 according to the state of its corresponding environmental sensor 135.

This example embodiment of an electronic assembly further comprises a prediction unit 110. The prediction unit 100 generates a prediction signal according to the detection signal 130 and the environmental stress signal 140. It should be appreciated that the prediction signal, according to one alternative example embodiment, is provided to an external interface 105, which is included in yet another alternative example embodiment of an electronic assembly.

According to one alternative example embodiment, the sacrificial sensor comprises at least one of a solder-joint failure site and a complex-impedance component, as further described in the incorporated reference. These alternative example embodiments of a sacrificial sensor are not intended to limit the scope of the claims appended hereto and are presented herein for illustrative purposes only.

According to yet another alternative example embodiment, the environmental sensor comprises a temperature sensor, for example a thermal couple, a resistive thermal device or a thermally sensitive semi-conductive component. According to yet another alternative example embodiment, the environmental sensor comprises a humidity sensor, for example a thermoset capacitive polymer sensor. It should be appreciated that a thermoset capacitive polymer sensor is merely one example of a humidity sensor and is not intended to limit the scope of the claims appended hereto.

It yet another alternative example embodiment, the environmental sensor comprises a vibration sensor. One example embodiment of a vibration sensor comprises an accelerometer. It should be appreciated that an accelerometer is merely one form of a vibration sensor and is not intended to limit the scope of the claims appended hereto.

According to yet another example embodiment, the environmental sensor comprises a voltage sensor. A voltage sensor, according to one alternative example embodiment, comprises a comparator that compares an operating voltage to the reference voltage. According to yet another alternative example embodiment, the voltage sensor comprises an analog-to-digital converter. These are merely examples of various types of voltage sensors which are presented herein for illustration only and are not intended to limit the scope of the claims appended hereto.

In yet another alternative example embodiment, the environmental sensor comprises a corrosive substance sensor. It should be appreciated that, according to one alternative example embodiment, a corrosive substance sensor comprises a galvanic corrosion sensor as heretofore described. It should likewise be appreciated that a galvanic corrosion sensor is merely one example of a corrosive substance sensor and is not intended to limit the scope of the claims appended hereto.

Figure 7A:
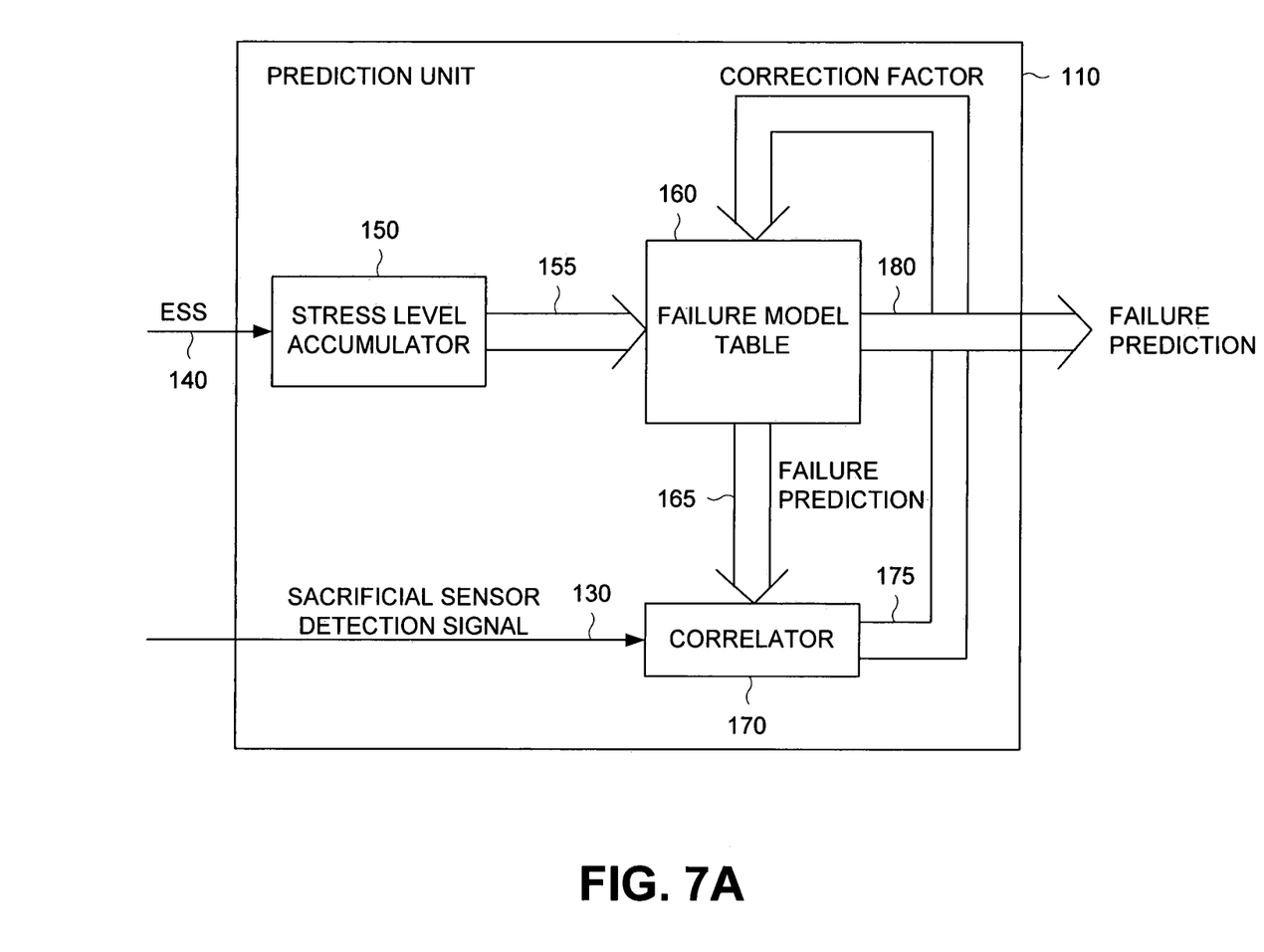
FIG. 7A is a block diagram that depicts one alternative example embodiment of a prediction unit.

FIG. 7A is a block diagram that depicts one alternative example embodiment of a prediction unit. According to this alternative example embodiment, a prediction unit 100 comprises a failure model table 160 and a correlator 170. It should be appreciated that the failure model table 160 is capable of storing a failure prediction model. According to this alternative example embodiment, the correlator receives an environmental stress signal 140 and uses the environmental stress signal 140 to select a failure prediction (165, 180). According to yet another alternative example embodiment, the prediction unit 100 further comprises a stress level accumulator 150. It should be appreciated that the stress level accumulator 150 monitors on incoming environmental stress signal 140, which typically is generated by a conditioning circuit 137 associated with an environmental stress sensor 135. The stress level accumulator 150 than generates a cumulative stress metric 155. According to one alternative example embodiment, the stress level accumulator 150 generates a cumulative stress metric 155 by integrating an environmental stress signal 140 over an interval of time.

According to one alternative example embodiment, the cumulative stress metric 155 is used to select a failure prediction 165 for an amount of incremental change that is expected to be exhibited by a sacrificial sensor 120. The failure prediction for the sacrificial sensor 165 is then presented to the correlator 170 in conjunction with an actual amount of sacrificial sensor incremental change, as reflected in the sacrificial sensor detection signal 130. The correlator 170 of this alternative example embodiment generates a correction factor 175, which is then fed back to the failure model table 160. The failure model table 160 updates a failure model stored therein according to the correction factor 175. It should be appreciated that the correction factor 175 adjusts not only the failure prediction for the sacrificial sensor 165 but also a general failure or degradation prediction 180 for other components (i.e. functional components) included in the electronic assembly.

Figure 8:
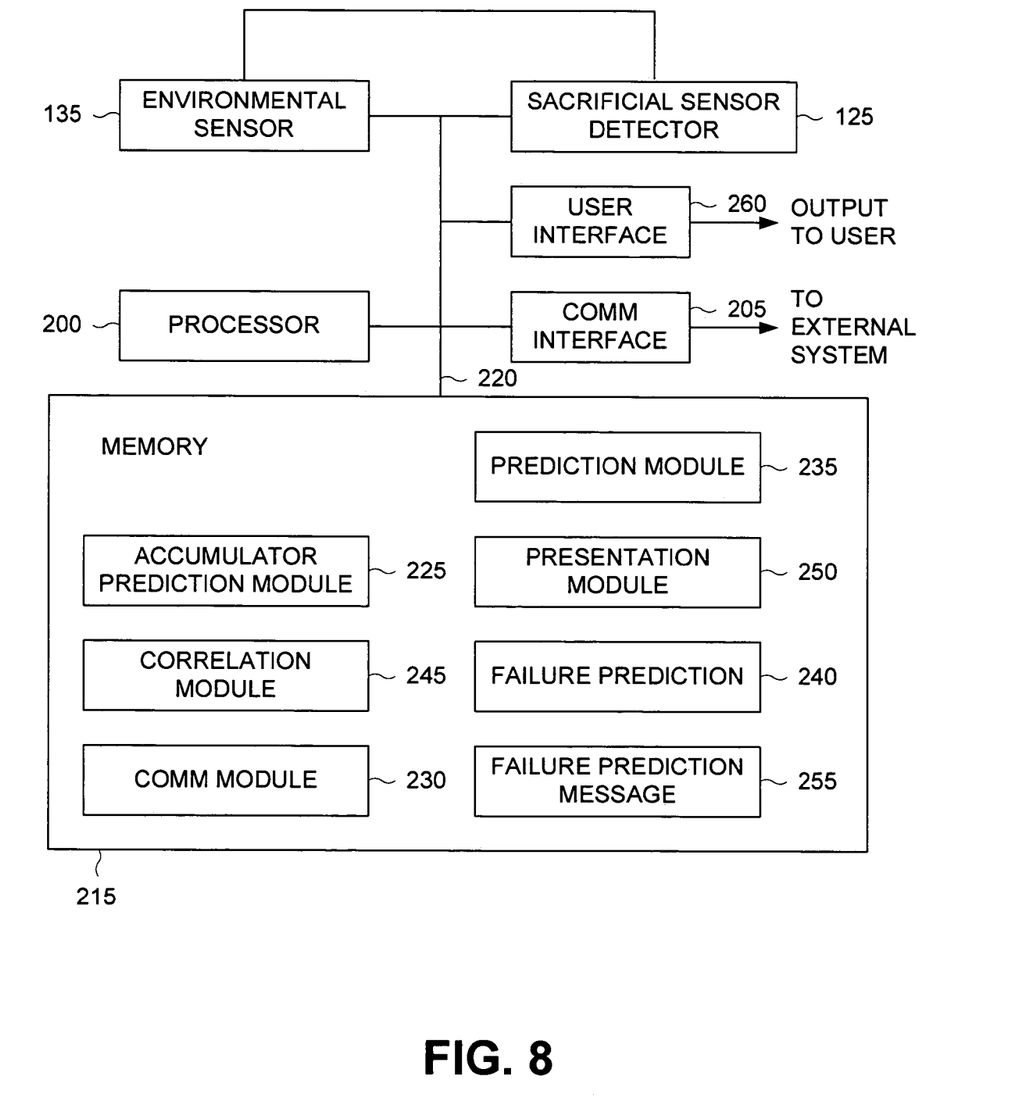
FIG. 8 is a block diagram that depicts several alternative example embodiments of a processor-based prediction unit.

FIG. 8 is a block diagram that depicts several alternative example embodiments of a processor-based prediction unit. According to one alternative example embodiment, the prediction unit 110 includes an interface 205 capable of communicating with an external apparatus. This example embodiment of a prediction unit 110 further includes a processor 200, which is capable of executing one or more instruction sequences. A memory 215 is also included in this example embodiment of a prediction unit 110. The memory 215 is capable of storing at least one or more instruction sequences and is further capable of storing information. The memory 215 is used to store one or more instruction sequences and a failure prediction table 240. To one alternative example embodiment, the prediction unit 110 further comprises a user interface 260, which can be used to present output to a user. It should be appreciated that the prediction unit 110 receives information from an environmental sensor 135 and a sacrificial sensor 125, both of which are typically included in electronic assembly. It should likewise be appreciated that the environmental sensor 135 or the sacrificial sensor 125, according to one alternative example embodiment, are included on the electronic assembly or proximate thereto, and that the prediction unit 110 is distally located from the electronic assembly. In an embodiment where the prediction unit 110 is distally located from the electronic assembly, the prediction unit 110 typically does not included the communications module and does not included the accumulator module.

Various example embodiments of a prediction unit 110 as heretofore described further include various functional modules each of which comprises an instruction sequence that can be executed by the processor 200. An instruction sequence that implements a functional module, according to one alternative embodiment, is stored in the memory 215. The reader is advised that the term "minimally causes the processor" and variants thereof is intended to serve as an open-ended enumeration of functions performed by the processor 200 as it executes a particular functional module (i.e. instruction sequence). As such, an embodiment where a particular functional module causes a processor 200 to perform functions in addition to those defined in the appended claims is to be included in the scope of the claims appended hereto. Included in one example embodiment of a prediction unit 110 are an accumulator module 225, a correlation module 245, a prediction module 235 and a communications (COMM) module 230. According to yet another alternative example embodiment, the prediction unit 110 further includes a presentation module 250. It should be appreciated that all these functional modules are stored in the memory 215.

The functional modules (and their corresponding instruction sequences) described thus far that enable prediction of a failure of an electronic assembly, according to one alternative embodiment, are imparted onto computer readable medium. Examples of such medium include, but are not limited to, random access memory, read-only memory (ROM), Compact Disk (CD) ROM, Digital Versatile Disk (DVD), floppy disks, hard disk drives and magnetic tape. Yet other examples include, but are not limited to a software download channel wherein an instruction sequence is received by means of a communications channel and then stored in the memory 215. These forms of computer readable medium, which alone or in combination can constitute a stand-alone product, can be used to convert a general-purpose computing device into a prediction unit that is capable of predicting a failure of an electronic assembly according to the techniques and teachings presented herein. Accordingly, the claims appended hereto are to include such computer readable medium imparted with such instruction sequences that enable execution of the present method and all of the teachings herein described.

Figure 9:
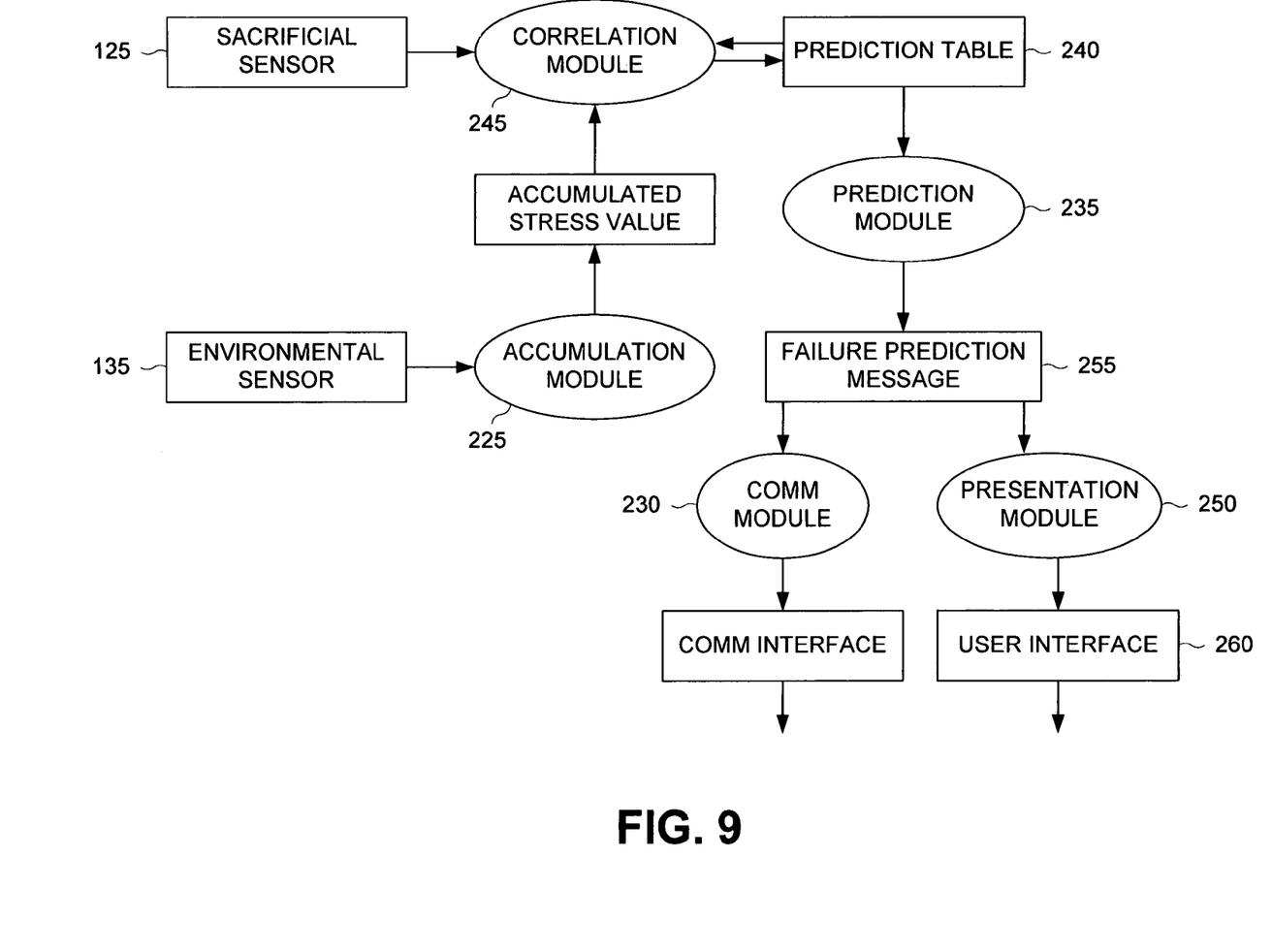
FIG. 9 is a data flow diagram that depicts the internal operation of several example embodiments of a prediction unit.

FIG. 9 is a data flow diagram that depicts the internal operation of several example embodiments of a prediction unit. According to one example embodiment, the processor 200 included in a prediction unit 110 executes the accumulator module 225. The accumulator module 225, when executed by the processor 200, minimally causes the processor to create in the memory a cumulative stress value 227. The processor 200 executes the accumulator module 225 on a periodic basis in order to affect a discrete integration of an environmental stress signal received from an environmental sensor 135, which results in the creation of the cumulative stress value 227.

The cumulative stress value 227 is used by the processor as it executes the correlation module 245. As the processor 200 executes the correlation module 245, it is minimally caused to update a failure prediction table 240 stored in the memory 215. In operation, the processor 200, as it continues to execute the correlation module 245, selects an entry in the prediction table 240 according to the cumulative stress value 227. The processor then retrieves a value of an incremental change that the sacrificial sensor 125 is expected to exhibit according to the cumulative stress value 227. The correlation module 245 then adjusts the cumulative stress value associated with an actual amount of exhibited incremental change received from the sacrificial sensor 125 and stores this back into the prediction table 240. In this manner, all other predictions associated with a particular cumulative stress value are adjusted as well. Typically, this process continues on a periodic basis so that a failure prediction stored in the failure prediction table 240 is updated throughout an expected life of an electronic assembly.

The processor 200 also executes the prediction module 235. The prediction module, when executed by the processor 200, minimally causes the processor to use the cumulative stress value 227 to select a prediction from the prediction table 240. The selected prediction represents a prediction of a possible failure or anticipated degradation of a functional component included in an electronic assembly. The selected prediction is used a basis for generating a failure prediction message 255. The processor 200 then executes the communications module 230. The communications module 230, when executed by the processor, minimally causes the processor 200 to retrieve the failure prediction message 255 from the memory 215 and direct the failure prediction message to the communications interface 205. This results in conveyance of the failure prediction message to an external apparatus.

Figure 10:
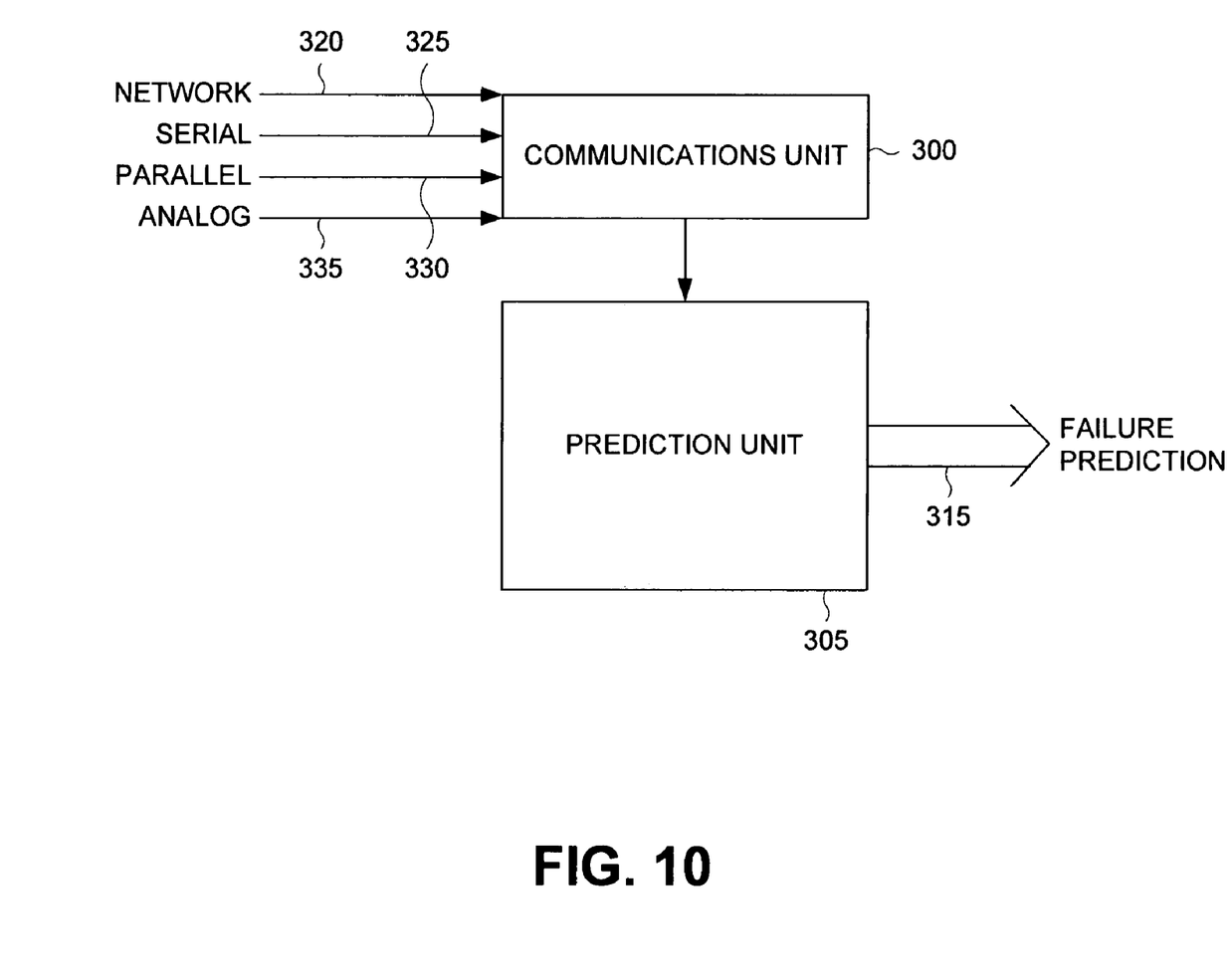
FIG. 10 is a block diagram that depicts a system for predicting a failure in an electronic assembly wherein a prediction unit is distally located from the electronic assembly.

FIG. 10 is a block diagram that depicts a system for predicting a failure in an electronic assembly wherein a prediction unit is distally located from the electronic assembly. According to this example alternative embodiment, a system for predicting a failure in an electronic assembly comprises a communications unit 300 and a prediction unit 305. According to this alternative example embodiment, the communications unit 300 receives the sacrificial sensor detection signal and environmental stress signal from a remotely located electronic assembly. These are then communicated to the prediction unit 305. It should be appreciated that the communications unit 300, according to one alternative example embodiment, receives a sacrificial sensor detection signal from an electronic assembly. It alternative example embodiment, the communications unit 300 receives an environmental stress signal from an environmental monitoring system. It should be appreciated that, according to one illustrative use case, an environmental monitoring system is used to monitor an ambient environment in which an electronic assembly is operating. It should likewise be appreciated that, according to one alternative example embodiment, the environmental stress signal received by the communications unit 300 comprises a cumulative environmental stress signal. According to one alternative example embodiment, the communications unit 300 comprises at least one of a computer network interface 320, a serial data interface 325, a parallel data interface 330 and an analog signal interface 335. Each of these interface types, according to yet another example embodiment, are capable of receiving at least one of an environment stress signal and a sacrificial sensor incremental change detection signal.

According to one alternative example embodiment, the prediction unit 305 is based on a processor, as heretofore described. In this processor based embodiment of the prediction unit 305, as illustrated in FIG. 9, the processor also executes the presentation module 250. The presentation module 250, when executed by the processor 200, minimally causes the processor 200 to retrieve the failure prediction message 255 from the memory 215 and direct the failure prediction message to the user interface 260. This results in presentation 315 of the failure prediction message to a user.

While the present method and apparatus have been described in terms of several alternative methods and embodiments, it is contemplated that alternatives, modifications, permutations, and equivalents thereof will become apparent to those skilled in the art upon a reading of the specification and study of the drawings. It is therefore intended that the true spirit and scope of the claims appended hereto include all such alternatives, modifications, permutations, and equivalents.

Throughout the instant disclosure, the Applicant refers to storage of a failure prediction model in a table format. It should be appreciated that any form of failure prediction model can be used and the scope of the appended claims are not intended to by limited to variations of the present method and alternative embodiments that use a failure prediction model that is organized as a table. For example, a failure prediction model comprises a finite-element-analysis in one alternative example embodiment that also is not intended to limit the scope of the claims appended hereto.

What is claimed is:

1. An electronic assembly comprising:

functional circuit embodied on a substrate;

sacrificial sensor capable of exhibiting an incremental change upon exposure to an environmental stress factor;

detector capable of generating a detection signal according to an incremental change exhibited by the sacrificial sensor;

environmental sensor capable of detecting the state of an environmental stress factor;

conditioning circuit capable of generating an environmental stress signal according to the state of the environmental sensor;

prediction unit capable of generating a prediction signal according to the detection signal and the environmental stress signal; and wherein the prediction unit comprises:

processor capable of executing an instruction sequence;

memory capable of storing one or more instruction sequences and is further capable of storing information;

external interface that enables the processor to communicate with an external apparatus;

failure prediction table stored in the memory; and one or more instruction sequences stored in the memory including:

accumulator module that, when executed by the processor, minimally causes the processor to create in the memory an accumulated stress value according to the environmental stress signal;

correlation module that, when executed by the processor, minimally causes the processor to update a failure prediction in the failure prediction table according to the accumulated stress value and also according to the detection signal;

prediction module that, when executed by the processor, minimally causes the processor to store in the memory a failure prediction message generated according to a prediction stored in the failure prediction table and selected according to the accumulated stress signal; and communications module that, when executed by the processor, minimally causes the processor to direct the failure prediction message from the memory to the external interface.

2. A system for predicting a failure in an electronic assembly comprising:
- communications unit capable of receiving a sacrificial sensor detection signal and an environmental stress signal;
- prediction unit capable of generating a prediction signal according to the detection signal and the environmental stress signal;
- wherein the prediction unit comprises:
- processor capable of executing an instruction sequence;
- memory capable of storing one or more instruction sequences and is further capable of storing information;
- failure prediction table stored in the memory; and
- one or more instruction sequences stored in the memory including:
  - correlation module that, when executed by the processor, minimally causes the processor to update a failure prediction in the failure prediction table according to the environmental stress signal and also according to the sacrificial sensor detection signal;
  - prediction module that, when executed by the processor, minimally causes the processor to store in the memory a failure prediction message generated according to a prediction stored in the failure prediction table and selected according to the environmental stress signal; and
  - presentation module that, when executed by the processor, minimally causes the processor to present to a user a failure prediction according to the failure prediction stored in the memory.

* * * * *